United States Patent
Phadke

(10) Patent No.: US 8,232,674 B2
(45) Date of Patent: Jul. 31, 2012

(54) MULTIPLE OUTPUT ISOLATED DC/DC POWER CONVERTERS

(75) Inventor: Vijay G. Phadke, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 690 days.

(21) Appl. No.: 12/208,802

(22) Filed: Sep. 11, 2008

(65) Prior Publication Data

US 2010/0026095 A1 Feb. 4, 2010

Related U.S. Application Data

(60) Provisional application No. 61/085,316, filed on Jul. 31, 2008.

(51) Int. Cl.
  *H02J 3/14* (2006.01)
(52) U.S. Cl. .......................................................... 307/31
(58) Field of Classification Search .................. 363/15, 363/20, 21.01, 37, 16, 21.06; 307/31, 32, 307/33
  See application file for complete search history.

(56) References Cited

U.S. PATENT DOCUMENTS

| | | |
|---|---|---|
| 5,444,608 A | 8/1995 | Jain et al. |
| 6,181,585 B1 | 1/2001 | Cardwell, Jr. et al. |
| 6,330,169 B2 | 12/2001 | Mullett et al. |
| 6,552,917 B1 * | 4/2003 | Bourdillon ................. 363/21.12 |
| 6,987,679 B2 * | 1/2006 | Gan et al. ........................ 363/89 |
| 7,233,083 B2 | 6/2007 | Stowell et al. |
| 2002/0071291 A1 * | 6/2002 | Johnson .......................... 363/16 |

OTHER PUBLICATIONS

Yanjun Zhang; Dehong Xu; Fengchuan Gao; Yu Han; Zhong Du; , "Accurately regulated multiple output ZVS dc-dc converter," Applied Power Electronics Conference and Exposition, 2006. APEC '06. Twenty-First Annual IEEE , vol., No., pp. 6 pp., Mar. 19-23, 2006.*
"Study of Dynamic Properties of a Multi-Output Converter Topology Suitable for Multi-Point Load Applications," Youhao Xl and Praveen K. Jain; PESC 2002; pp. 1565-1570.
"Switching Power Supply Design," Abraham Pressman, Second Edition, 1998; pp. 170-175.

* cited by examiner

*Primary Examiner* — Daniel Cavallari
(74) *Attorney, Agent, or Firm* — Harness, Dickey & Pierce, P.L.C.

(57) ABSTRACT

Methods of regulating an output voltage of a multi-output isolated power converter are disclosed. One method includes allowing the output voltage to vary unregulated when the output voltage is below a threshold value and preventing the output voltage from increasing when the output voltage reaches the threshold value. Additional methods and multi-output power supplies are also disclosed.

29 Claims, 12 Drawing Sheets

MULTIPLE OUTPUT ISOLATED DC/DC POWER CONVERTERS

CROSS-REFERENCE TO RELATED APPLICATIONS

This application claims the benefit of U.S. Provisional Application No. 61/085,316 filed Jul. 31, 2008, the entire disclosure of which is incorporated herein by reference.

BACKGROUND

This section provides background information related to the present disclosure which is not necessarily prior art.

Multi-output power converters are used in numerous applications including power supplies for desktop computers, workstation computers and LCD televisions. In recent years, high efficiency requirements for power supplies and power converters have been dictated by various governmental agencies, such as the EPA, and non-governmental voluntary agencies, such as Climate Savers. Although target power supply efficiencies may be achieved, it often results in a very high cost premium and/or low power densities.

For computer power supply applications, the load profile is well known and the minimum load on each output can be easily defined. The expected load variation has a predictable profile. The typical output voltages in a multi-output computer power supply are 3.3V, 5V and 12V, with the bulk of the power on the 12V rail. The slew rate of the transient step load on each output of the power supply is not very demanding and is typically about 0.1 A/uSec. The regulation of each output voltage typically needs to be in the range of +/−5%.

LCD television power supplies typically provide three to four output voltages, such as +12V, −12V and 24V. Such power supplies often require galvanic isolation between the multiple outputs to achieve a common chassis ground and avoid circulating currents. The loads on the multiple output rails can vary between no load and full load, including a short term peak load rating. For example, the loading on a power supply output used for an audio amplifier can decrease to near no load when the sound is muted. Similarly, the load on the output providing power to an LCD inverter can swing from no load to full load when the picture frame switches between completely dark to fully bright. Such wide load ranges on each output can exist simultaneously, making it difficult for a simple converter with a coupled winding to achieve cross regulation.

Several known techniques meet these application requirements but struggle to attain high efficiency while being cost effective. A few of the established techniques are discussed below.

In one known power supply, a standard forward converter is used in conjunction with magnetic amplifiers to deliver multiple regulated outputs. Typically, one output is directly regulated by the control loop of the forward converter while magnetic amplifiers are used for the other outputs. Alternatively, magnetic amplifiers can be used for all the outputs as well. Low conversion efficiency and electromagnetic noise due to interaction between different magnetic amplifiers are common difficulties with such an approach.

In a second approach, independent power converters are used for each output rail. Although this can achieve desired efficiency goals, it uses a large number of components and can be expensive.

Another known approach is to use a high efficiency converter with synchronous rectification for the main, e.g., 12V, output. The main output is then used as an input bus for separate high efficiency buck converters using synchronous rectifiers. These separate buck converters are driven by the input bus to generate low voltage outputs. Such an approach may be costly and can achieve only moderate efficiencies as the power losses are cascaded in series.

Another technique uses multiple secondary windings on a single transformer. The main output, usually the 12V output, utilizes closed loop control to maintain a well regulated output. The other low voltage outputs, such as 3.3V and 5V, depend upon inherent cross regulation. Minor trimming of these low voltage outputs is achieved by dropping some voltage across the synchronous rectifiers by operating them in linear mode. Thus the synchronous rectifiers are operated similar to a variable resistor. This method is dissipative and gives little control over regulation as the voltage drop in a synchronous rectifier can only be controlled in the range of 0V to 0.7V. Additionally, this method tends to lead to use of bulky and lossy transformers to meet design requirements for a multiple output power supply as the turns ratio must be the same as the ratio of output voltages. For example, a typical computer power supply having 3.3V, 5V and 12V outputs must have a transformer using 2, 3 and 7 secondary turns, respectively, or an integer multiple. It is also very difficult to extend the operation of such a power supply to higher power applications, such as workstation computers which may need up to 1 kW of output power.

SUMMARY

This section provides a general summary of the disclosure, and is not a comprehensive disclosure of its full scope or all of its features.

According to one aspect of the present disclosure, an isolated DC/DC power converter has multiple outputs. The power converter includes an input for receiving a DC input voltage and a pre-regulator for generating a regulated DC voltage from the DC input voltage. The power converter also includes first and second transformers each having a primary winding and a secondary winding and first and second output stages coupled to the secondary windings of the first and second transformers, respectively. Each output stage including a synchronous rectifier and one of the multiple outputs. The power converter further includes a primary switching circuit having a primary switch. The primary switching circuit is coupled between the pre-regulator and the primary winding of each transformer. The power converter also includes a first regulation circuit coupled to the synchronous rectifier of the second output stage and a control circuit coupled to the first regulation circuit and configured to generate a rectifier control signal for controlling the synchronous rectifiers of said output stages. The first regulation circuit is configured to provide the rectifier control signal substantially unmodified to the synchronous rectifier of the second output stage when a voltage at the output of the second output stage is below a first threshold voltage. The first regulation circuit is configured to provide the rectifier control signal with a reduced on-time to the synchronous rectifier of the second output stage when the voltage at the output of the second output stage is substantially equal to or greater than the first threshold voltage.

According to another aspect of the present disclosure, an isolated DC/DC power converter for providing a plurality of output voltages includes plurality of transformers, each of the plurality of transformers having a primary winding and a secondary winding. The power converter also includes a primary switching circuit coupled to the primary winding of each of the plurality of transformers, the primary switching circuit including an input for receiving an input voltage and at least one switch for switching current through the primary winding of each of the plurality of transformers. The power converter also includes a plurality of output circuits each coupled to a secondary winding of one of the plurality of transformers. Each of the output circuits includes an output for providing one of the plurality of output voltages, at least one rectifier and an output capacitor.

According to yet another aspect of the present disclosure, a method of regulating an output voltage of a multi-output isolated DC/DC power converter having a transformer, a primary side switch coupled to a primary winding of the transformer, and a synchronous rectifier coupled to a secondary winding of the transformer and an output of the power converter is disclosed. The method includes switching the primary side switch with a substantially constant switch duty cycle and operating the synchronous rectifier at a substantially fixed frequency and a substantially constant rectifier duty cycle. The method further includes permitting the output voltage to vary unregulated when the output voltage is below a threshold voltage and limiting transfer of energy from the transformer to the output of the power converter when the output voltage reaches the threshold voltage.

According to still another aspect of the present disclosure, a multi-output power supply includes a regulated power converter for converting an input voltage to an intermediate voltage and an isolated power converter for converting the intermediate voltage to a plurality of output voltages. The isolated power converter has an unregulated primary switching circuit and a plurality of secondary side rectification circuits. The unregulated primary switching circuit is coupled to the intermediate voltage and a primary winding of a transformer. Each of the plurality of secondary side rectification circuits is coupled to one of a plurality of secondary windings of the transformer and provides one of the plurality of output voltages.

According to another aspect of the present disclosure, a multi-output power supply includes a regulated power converter for converting an input voltage to an intermediate voltage and an isolated power converter for converting the intermediate voltage to a plurality of output voltages. The isolated power converter has an unregulated primary switching circuit and a plurality of secondary side rectification circuits. The unregulated primary switching circuit is coupled to the intermediate voltage and a plurality of primary windings of a plurality of transformers. Each of the plurality of secondary side rectification circuits is coupled to a secondary winding of one of the plurality of transformers and provides one of the plurality of output voltages.

According to another aspect of the present disclosure, a multi-output isolated power converter includes an unregulated primary switching circuit having a switch for switching an input voltage across at least one transformer primary winding and a plurality of secondary output circuits each coupled to a transformer secondary winding. Each of the plurality of secondary output circuits includes a synchronous rectifier and is configured to provide an output voltage when the power converter is operating. The power converter also includes a control circuit coupled to the switch and the synchronous rectifier of each of the plurality of secondary output circuits. The control circuit is configured to provide, when the power converter is operating, a switching control signal to the switch and a rectifier control signal to the synchronous rectifier of each of the plurality of secondary output circuits. The power converter further includes a regulation circuit coupled between the control circuit and the synchronous rectifier of one of the plurality of secondary output circuits. The regulation circuit operable to prevent the synchronous rectifier to which it is coupled from receiving a portion of the rectifier control signal when the output voltage of the one of the plurality of secondary output circuits exceeds a threshold.

According to yet another aspect of the present disclosure, a method of limiting an output voltage of a multi-output isolated power converter including a transformer including a primary winding and a secondary winding, a switch coupled to the primary winding and a synchronous rectifier coupled to the secondary winding is disclosed. The method includes switching the switch with a switch control signal having a substantially constant switch frequency and a substantially constant switch duty cycle to switch an input voltage across the primary winding of the transformer. The method also includes switching the synchronous rectifier with a control signal having a substantially constant rectifier frequency and a substantially constant rectifier duty cycle. The method further includes preventing the synchronous rectifier from receiving a portion of the control signal to shorten an on-time of the synchronous rectifier without otherwise altering the rectifier frequency, rectifier duty cycle, switch frequency and switch duty cycle.

According to still another aspect of the present disclosure, a method of regulating an output voltage of a multi-output isolated power converter is disclosed. The method includes allowing the output voltage to vary unregulated when the output voltage is below a threshold value and preventing the output voltage from increasing when the output voltage reaches the threshold value.

According to another aspect of the present disclosure, a method of converting an input voltage to a plurality of output voltages in an isolated DC/DC power converter including a plurality of transformers, a switching circuit coupled to the plurality of transformers and a plurality of output circuits coupled to the plurality of transformers is disclosed. The method includes switching, with the switching circuit, the input voltage across a primary winding of each of the plurality of transformers to generate a secondary voltage across a secondary winding of each of the plurality of transformers. The method also includes rectifying the secondary voltage of each of the plurality of transformers by a respective one of the plurality of output circuits.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
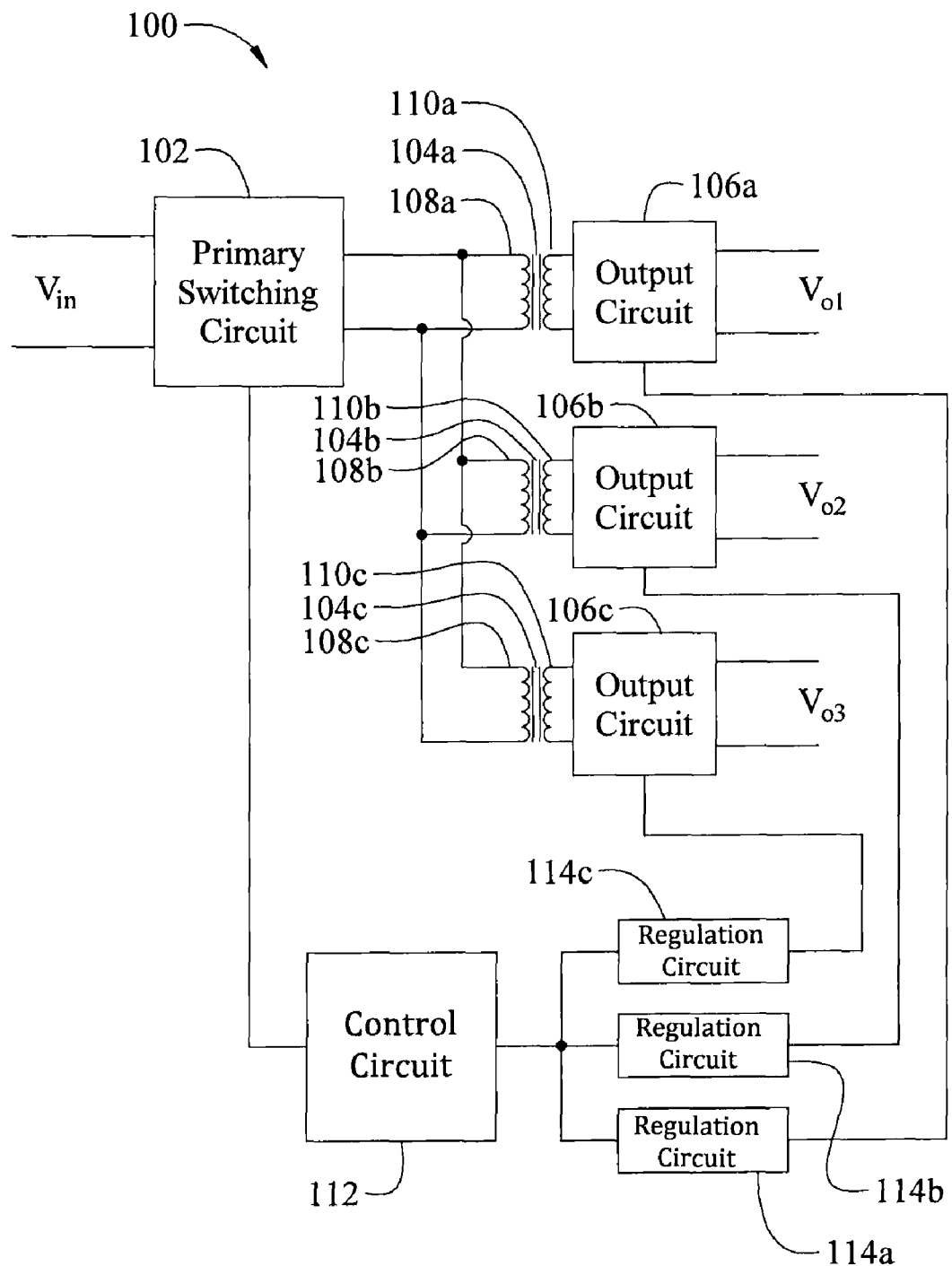
FIG. 1 is a block diagram of a multi-output isolated power converter and control circuit.

Example embodiments will now be described more fully with reference to the accompanying drawings.

According to one aspect of the present disclosure, a method of limiting an output voltage of a multi-output isolated power converter is disclosed. The power converter includes a transformer having a primary winding and a secondary winding, a switch coupled to the primary winding, and a synchronous rectifier coupled to the secondary winding. The method includes switching the switch with a switch control signal having a substantially constant switch frequency and a substantially constant switch duty cycle to switch an input voltage across the primary winding of the transformer. The method further includes switching the synchronous rectifier with a control signal having a substantially constant rectifier frequency and a substantially constant rectifier duty cycle. Additionally, the method includes preventing the synchronous rectifier from receiving a portion of the control signal to shorten an on-time of the synchronous rectifier without otherwise altering the rectifier frequency, rectifier duty cycle, switch frequency and switch duty cycle.

According to another aspect of the present disclosure, a method of regulating an output voltage of a multi-output isolated power converter is disclosed. The method includes allowing the output voltage to vary unregulated when the output voltage is below a threshold value and preventing the output voltage from increasing when the output voltage reaches the threshold value.

According to yet another aspect of the present disclosure, a method of converting an input voltage to a plurality of output voltages in an isolated switching power converter including a plurality of transformers is disclosed. A switching circuit is coupled to the plurality of transformers and a plurality of output circuits are coupled to the plurality of transformers. The method includes switching, with the switching circuit, the input voltage across a primary winding of each of the plurality of transformers to generate a secondary voltage across a secondary winding of each of the plurality of transformers. The method further includes rectifying the secondary voltage of each of the plurality of transformers by a respective one of the plurality of output circuits.

Power converters and power supplies according to one or more of the aforementioned aspects will be described below with reference to FIGS. 1-11. It will be understood, however, that the aspects discussed above can be implemented individually or in combination. Additionally, the aspects discussed above can also be implemented in power converters having different topologies than are illustrated herein, such as forward converters, flyback converters, push-pull converters, etc. Furthermore, converters with more or fewer voltage outputs may implement the aspects discussed above.

A power converter, generally indicated by the reference numeral 100, according to all of the aspects discussed above is shown in FIG. 1. The power converter 100 includes a primary switching circuit 102, three transformers 104a-104c and three output circuits 106a-106c. The switching circuit 102 is coupled in parallel to primary windings 108a-108c of the transformers 104a-104c. The output circuits 106a-106c are coupled to respective secondary windings 110a-110c of the transformers 104a-104c. A control circuit 112 provides a switching control signal for a switch in the primary switching circuit 102 and a rectifier control signal for synchronous rectifiers in the output circuits. Regulation circuits 114a-114c are coupled between the control circuit 112 and the output circuits 106a-106c.

In operation, the power converter 100 converts an input voltage Vin to output voltages Vo1, Vo2 and Vo3. The input voltage is a tightly regulated input voltage resulting in very little change in the input voltage to the power converter. The primary switching circuit 102 switches the input voltage across the primary windings 108a-108c according to the switching control signal from the control circuit 112. The specific operation of the primary switching circuit depends on the topology chosen for the power converter 100. Example circuits of various topologies will be discussed hereinafter. The control circuit 112 provides control signal with a substantially constant duty cycle and frequency to the primary switching circuit 102. Thus the primary side of the converter 100 is unregulated. Secondary voltages across each of the secondary windings 110a-110c are rectified and output by the output circuits 106a-106c.

The control circuit 112 provides a rectifier control signal in parallel to each of the output circuits 106a-106c to control the synchronous rectifiers. These constant duty cycle and constant frequency signals pass through the regulation circuits 114a-114c before reaching the output circuits 106a-106c. The regulation circuits 114a-114c monitor the output voltage of each of the output circuits 106a-106c. When the output voltage for the output circuits 106a-106c are below a threshold voltage, the regulation circuits 114a-114c do nothing to the rectifier control signal. Thus, when the output voltage of an output circuit 106a-106c is below the threshold voltage, the secondary side of the power converter, like the primary side, is unregulated.

When one of the output voltages reaches the threshold voltage for that particular output circuit, the regulation circuit associated with that output circuit prevents the output circuit from receiving a portion of the rectifier control signal. For example, if the output of output circuit 106a reaches the threshold voltage, the associated regulation circuit 114a prevents the output circuit 106a from receiving a portion of the rectifier control signal. The other regulation circuits 114b and 114c continue to allow the rectifier control signal to pass unchanged, if the output voltage of the associated output circuits 106b and 106c remain below the appropriate threshold voltage. The regulation circuit 114a, however, blocks a portion of the rectifier control signal that causes the synchronous rectifier to turn on. Because the synchronous rectifier is turned on for a shorter time, some of the energy stored in the secondary winding 110a cannot be delivered to the output. Hence, this trimming of the rectifier control signal reduces the amount of energy delivered to the output and thereby limits the output voltage to about the threshold voltage. As, and if, the output voltage drops below the threshold voltage, the regulation circuit 114a ceases blocking the rectifier control signal and the output circuit 106a returns to unregulated operation.

Figure 2:
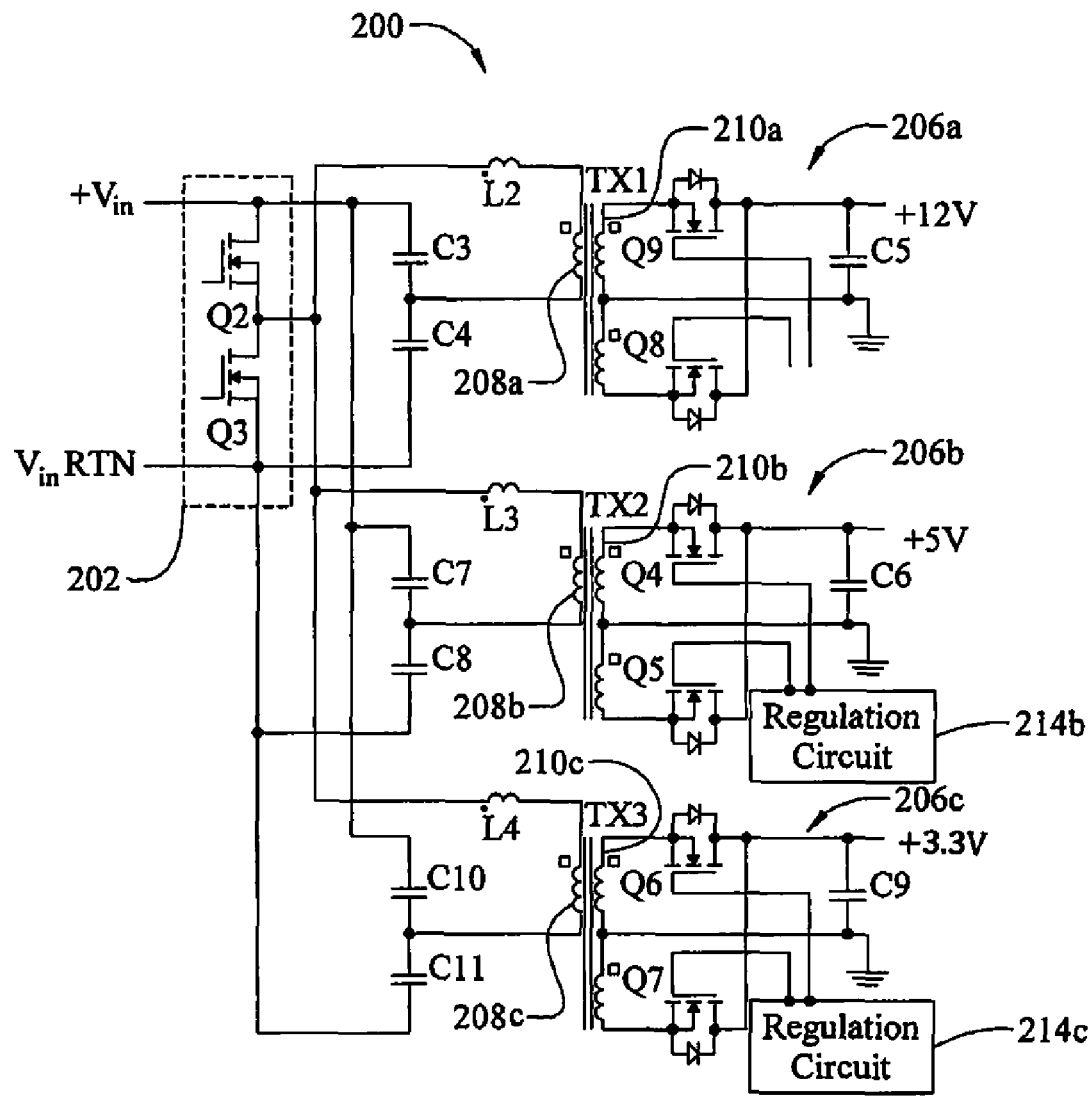
FIG. 2 is a circuit diagram of another multi-output isolated power converter having a half bridge configuration.

Another embodiment of a power converter 200 is illustrated in FIG. 2. For clarity, a control circuit operating in a manner similar to the control circuit 112 is not illustrated. The power converter 200 is an open loop (i.e., unregulated) half-bridge series resonant converter. The power converter 200 includes a primary switching circuit 202 having primary switches Q2, Q3, three transformers TX1-TX3 and three output circuits 206a-206c. The switching circuit 202 is coupled in parallel to primary windings 208a-208c of the transformers TX1-TX3. The output circuits 206a-206c are coupled to respective secondary windings 210a-210c of the transformers TX1-TX3 and provide three separate output voltages, for example +12V, +5V and +3.3V.

Regulation circuits 214b and 214c are coupled between the control circuit and synchronous rectifiers Q4, Q5, Q6, Q7 of the output circuits 206b and 206c. Synchronous rectifiers Q8, Q9 receive the rectifier control signal directly from the control circuit without use of a regulation circuit. The power converter 200 also includes splitting capacitors C3, C4, C7, C8, C10, C11 and inductors L2-L4 connected in series with the primary windings 208a-208c. Although illustrated as separate inductors, the inductors L2-L4 may also be the leakage inductance of the primary windings 208a-208c. Because each transformer TX1-TX3 has different leakage inductance due to variation in turns ratio, geometry, etc., separate splitting capacitors C3, C4, C7, C8, C10, C11 are used instead of a single pair of splitting capacitors to result in the same resonant frequency in all three branches of the power converter 200.

Figure 3:
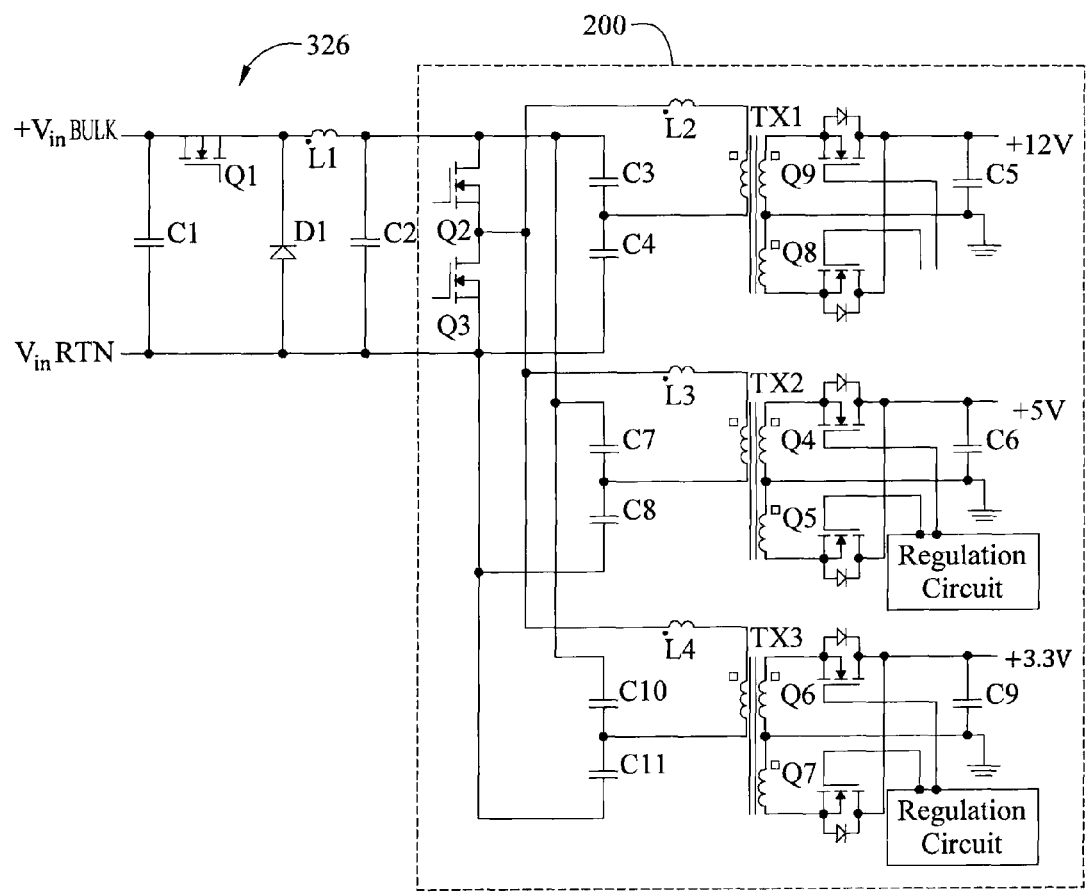
FIG. 3 is a circuit diagram of the multi-output isolated power converter of FIG. 2 coupled to a regulated buck converter.
Figure 4:
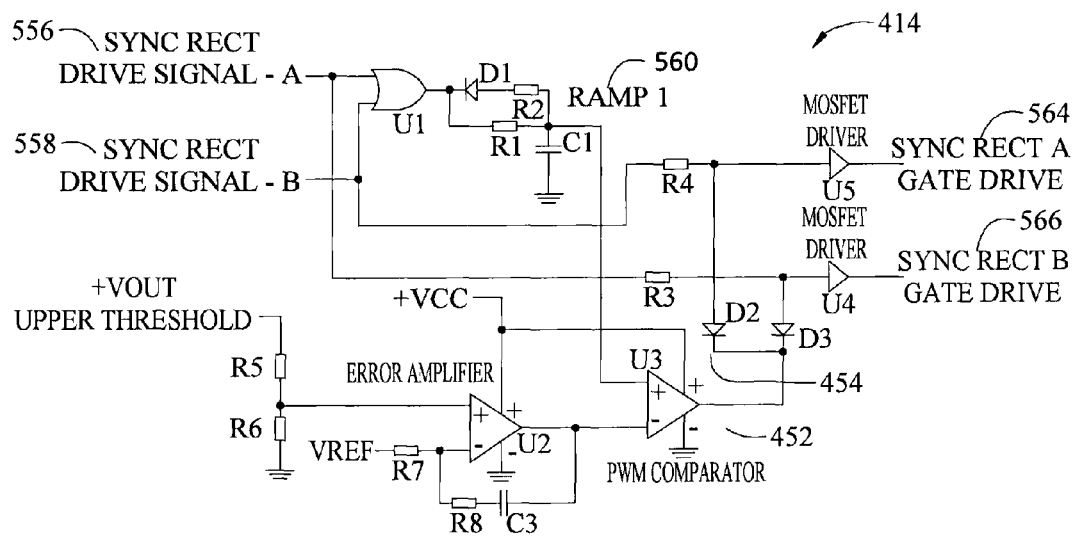
FIG. 4 is circuit diagram of an example regulation circuit for the multi-output isolated power converter of FIG. 2.

Operation of an example application specific embodiment of the power converter 200 will be more fully explained with reference to FIGS. 2 and 3. FIG. 3 illustrates the power converter 200 coupled to receive an input voltage from a regulated buck converter 326. The buck converter receives a bulk input voltage from another power supply stage, such as a PFC converter.

FIG. 3 shows a construction of a DC/DC converter block of a typical desktop computer or computer workstation power supply. The typical outputs required are 12V, 5V and 3.3V at a regulation of +/−5% and with a capability to handle step loads from 25% up to 50% at a slew rate of 0.1 A/uSec.

The buck converter 326 includes a switch Q1, a diode D1, an inductor L1 and an output capacitor C2. The buck converter 326 steps down a bulk voltage of approximately 400V, derived from a PFC front end, not shown, to a level of approximately 300V volts. The control loop of the buck converter 326 is designed for tight regulation and fast transient response. More specifically, the control loop is designed to meet a 50% transient step load at a slew rate of 0.1A/uSec with limited voltage over shoot and/or under shoot. The inductor L1 and the output capacitor C2 are chosen to assist in the design of a fast control loop and a low switching frequency ripple. The control signals for the switch Q1 and regulation of the buck converter 326 may be performed by the same control circuit that controls the converter 200 or a separate control circuit.

The power converter 200 is used to get desired output voltages from this well regulated voltage bus across output capacitor C2. The transformers TX1-TX3 provide galvanic isolation and voltage step down to desired levels. Each transformer TX1-TX3 has an appropriate turn ratio to yield the desired voltage step down.

Due to the common primary switching circuit 202, all of the transformers TX1-TX3 operate at the same switching frequency. As discussed above, the synchronous rectifiers Q9, Q4, Q6 share the same rectifier control signal while the synchronous rectifiers Q8, Q5, Q7 share another rectifier control signal. Because the transformers TX1-TX3 have different leakage inductances due to variation in turns ratio, geometry, etc., the separate input splitting capacitors C3, C4, C7, C8, C10, C11 are appropriately selected to result in the same resonant frequency.

The power converter 200 is operated at close to maximum duty cycle with a very short dead time between the switching transitions of the primary switches Q2, Q3. The dead time avoids any current shoot through and also allows a zero voltage switching transition for the primary switches Q2, Q3. A typical preferred dead time is in the rage of 100 nS to 400 nS. The primary switches Q2, Q3 and synchronous rectifiers Q4-Q9 are switched at nearly the same time, but with a short delay, such that the appropriate synchronous rectifiers Q4-Q9 are turned on after the associated primary switch Q2, Q3 is turned on and the respective secondary winding 210a-210c delivers its output pulse. The duration of this delay should be greater than zero, but kept reasonably short. This delay prevents any reverse current through the synchronous rectifiers Q4-Q9. Similarly, the synchronous rectifiers Q4-Q9 are turned off just before the associated primary switch Q2, Q3 is turned off.

Test results show the power converter 200 combined with the buck converter 326 and without the regulation circuits 214b, 214c provides a 12V output with +/−3% load regulation. The 5V and 3.3V output, however, achieved lower load regulation of approximately +/−5% for the 5V output and +/−7% for 3.3V output. This performance can be achieved easily by choosing appropriate components, and by controlling transformer winding and interconnect resistances. Adding the regulation circuits 214b, 214c to the power converter 200, improved the load regulation of the 5V and 3.3V outputs. In many applications, including the example discussed herein, +/−3% load regulation of the 12V output is sufficient and a regulation circuit is not needed for the 12V output. In other applications, however, a regulation circuit may be needed or useful.

More detailed discussion of the operation of the power converter 200 will be considered with particular reference to the 3.3V output and its associated branch of the power converter. The desired load regulation of +/−5% means the output voltage needs to be minimum 3.135V and maximum 3.465V. The turn ratio of the transformer TX3 for the 3.3V rail is chosen such that at full load and highest specified operating temperature, the output voltage is within the lower limit by some margin. A margin of 75 mV is suggested. This margin is generally enough to take care of variations, such as in component manufacturing tolerances, circuit construction, etc. For high efficiency designs, a typical target voltage drop in the synchronous rectifiers Q6, Q7 is about 100 mV. If this requirement is not met by using integral number of primary winding turns, then the buck converter 326 output voltage may be trimmed to achieve it.

As the output load starts to decrease from full load, the 3.3V output voltage will start to rise due to reducing voltage drops in the circuit parasitics. It will get close to upper regulation limit of 3.465V when the load is typically below 20% of the rated full load. A voltage threshold can be set with about a 75 mV margin, such as about 3.40V. When this threshold is reached, the regulation circuit 214c jumps in to modulate the synchronous rectifiers Q6, Q7 on time on the leading edge. At this light load point, the resistive drops in the circuit are very low. Thus when the output voltage reaches 3.40V, the amplitude of the secondary pulse is only marginally above 3.40V due to very low voltage drops in synchronous rectifiers Q6, Q7 and the transformer TX3. This flat top peak secondary voltage is dictated only by transformer turn ratio, input voltage and resistive voltage drops in primary circuits as well as secondary winding. This peak secondary voltage will be typically less than 3.50V at such light load condition. Thus, when a synchronous rectifier Q6 or Q7 is turned off, the difference between peak secondary voltage of 3.50V and output voltage of 3.40V is not enough to force the rectifier body diode of the synchronous rectifier Q6 or Q7 to conduct. Thus the resonant tank circuit is an open circuit and no energy transfer to the output occurs. When the synchronous rectifier Q6 or Q7 is turned on after a delay determined by the regulation circuit 214c, the primary winding 208c starts to transfer energy to the output through resonant action. Thus, the amount of energy delivered to a load can be controlled by modulating the on-time of the synchronous rectifier Q6, Q7. The lower energy transfer limits the output voltage. The energy stored in resonant tank circuit which is not delivered to output is returned back to bulk input supply when the primary switches Q2, Q3 turn off.

Thus the 3.3V rail output voltage is designed to be just inside the lower regulation limit of 3.315V by some practical margin at full load through component selection and by manipulating resistive drops in the circuits. This is ensured by design of the power rail and would need a different input voltage from the buck converter 326 or different component values in different applications. On the other side, the output voltage is allowed to go within some margin of the upper regulation limit of 4.465V and then clamped there by the regulation circuit 214c. As discussed above, this is done by blocking or delaying the synchronous rectifier control signal by an appropriate amount on the leading edge to control the energy delivered by resonant circuit.

Figure 5:
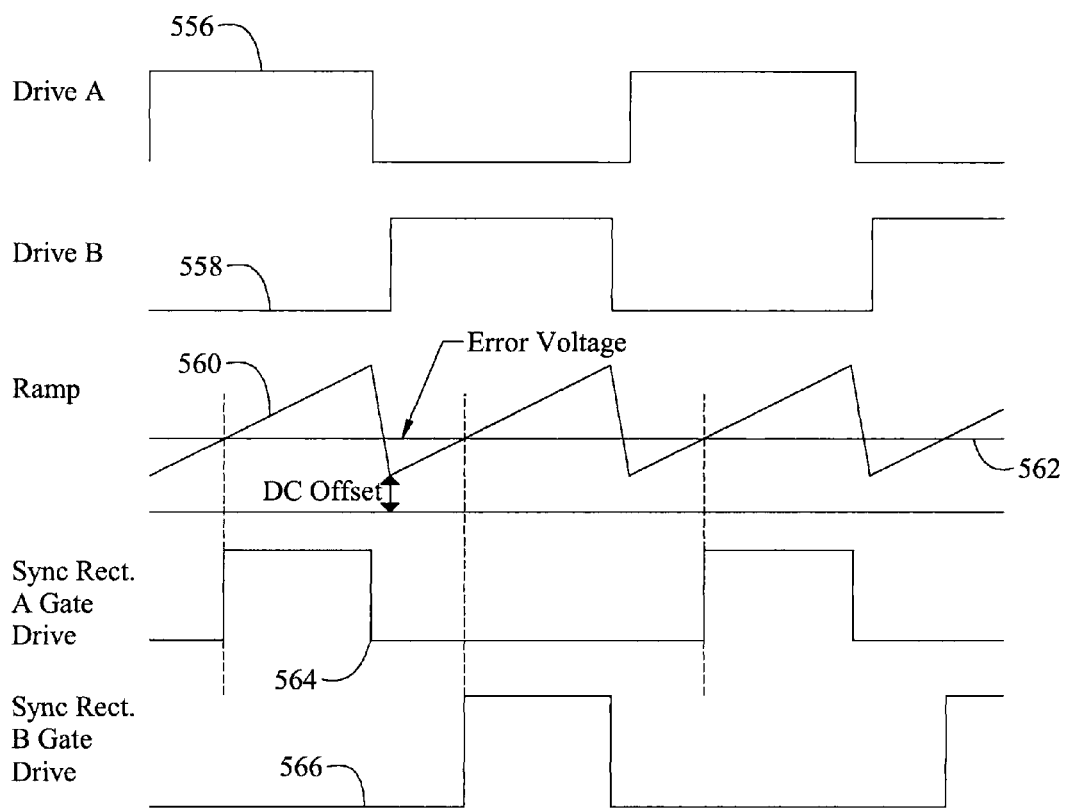
FIG. 5 is simulated waveforms of signals generated during operation of the circuit in FIG. 3.

A regulation circuit 414 capable of performing as described above is illustrated in FIG. 4. FIG. 5 illustrates waveforms for such a regulation circuit 414 when it is limiting the energy transferred to the output. In particular, it illustrates the rectifier control signals at 556 and 558, a ramp signal 560, and the regulated rectifier control signals 564 and 566. The rectifier control signals 556, 558 for both the synchronous rectifiers Q6 Q7 are connected to both an OR gate U1 and drivers U4, U5. The OR'ed rectifier control signals 556, 558 create a ramp signal 560, with the 0.7V DC offset created by a diode D1. The ramp signal 560 is generated across a capacitor C1. An error amplifier U2 compares the output voltage to a fixed reference voltage VREF. A voltage potential divider created by resistors R5 and R6 is set close to voltage regulation threshold of 3.4V as described above. The output of the error amplifier U2 is compared to the ramp signal 560 in a PWM comparator U3. When the output voltage is below the voltage regulation threshold, the error amplifier output U2 is low and PWM comparator U3 output is always high. This reverse biases diodes D2, D3 allowing the entire rectifier control signal 556, 558 to reach the drivers U4, U5 and the synchronous rectifiers Q6, Q7. When output voltage reaches the voltage regulation threshold of 3.40V, however, the error amplifier U2 outputs a high signal, or error voltage 562. The error voltage forces the PWM comparator U3 to go low at the start of the next rectifier control signal. This results forward biasing the diodes D2, D3 and pulling down the rectifier control signals 556, 558 by the PWM comparator 452 output for a time duration determined by the error voltage 562. At the end of this time duration, the PWM comparator U3 returns to a high output, the diodes D2, D3 are reverse biased and the rectifier control signal is again permitted to reach the drivers U4, U5 and the synchronous rectifiers Q6, Q7. The resulting trimmed signals are illustrated by 564 and 566 in FIG. 5. This trimming reduces synchronous rectifier Q6, Q7 on-time on the leading edge, which effectively delays the start of the resonant energy transfer and controls the energy delivered to the output. Thus it effectively regulates the output voltage at the set point by putting up a wall at the voltage regulation threshold.

Figure 6:
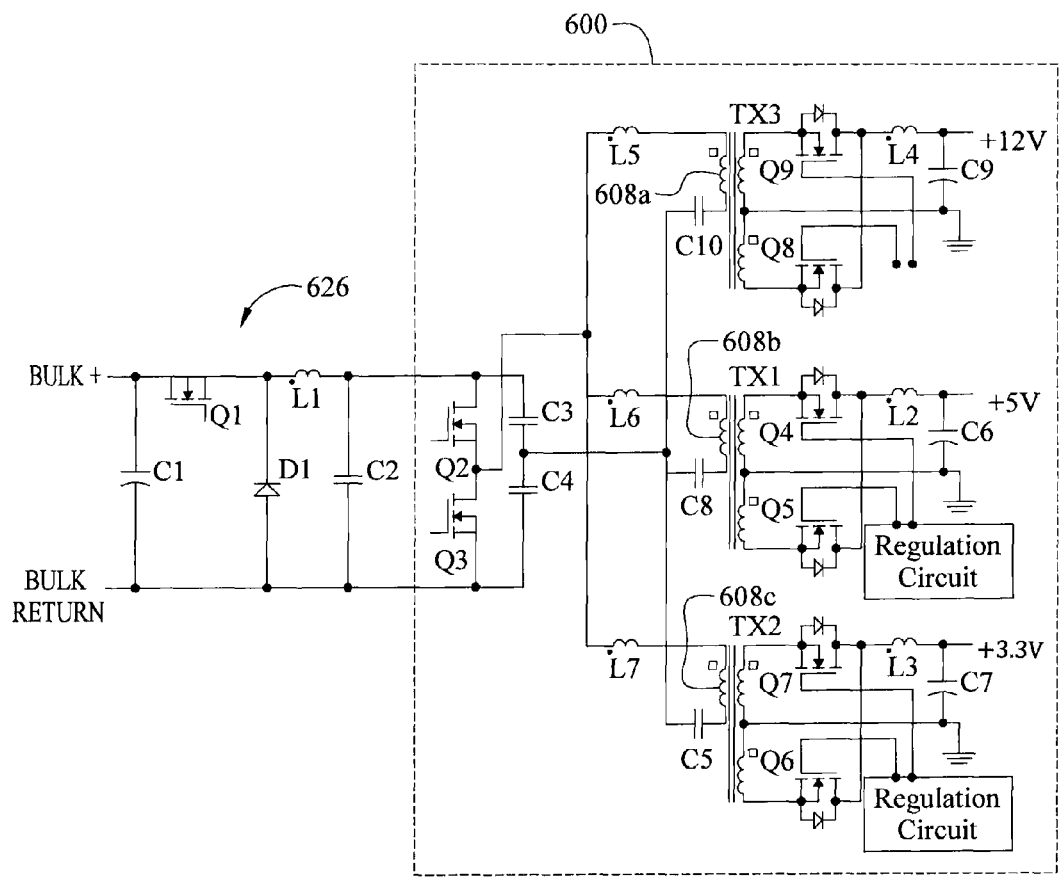
FIG. 6 is a circuit diagram of another multi-output isolated power converter having a half bridge configuration.
Figure 7:
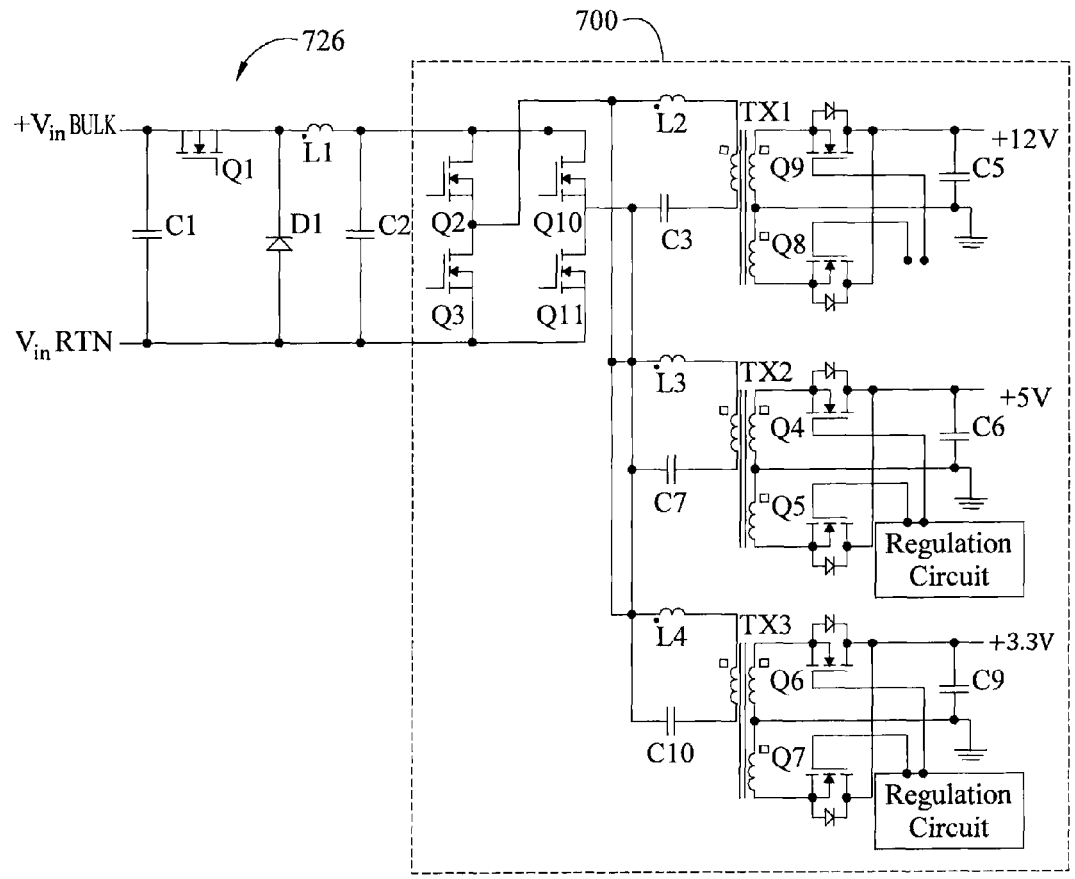
FIG. 7 is a circuit diagram of a multi-output isolated power converter having a full bridge configuration.
Figure 8:
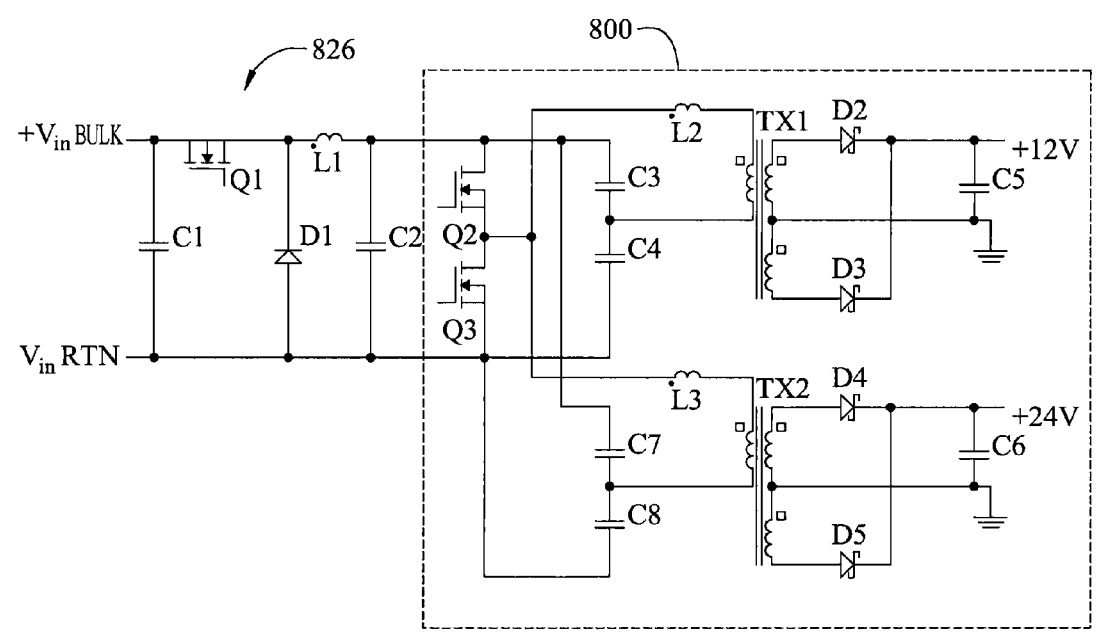
FIG. 8 is a circuit diagram of an unregulated multi-output isolated power converter having a half bridge configuration coupled to a regulated buck converter.

Another embodiment illustrated in FIG. 6 includes a power converter 600 coupled to receive a regulated input voltage from a buck converter 626. The power converter 600 is identical to the power converter 200 but includes a single pair of splitting capacitors C3, C4 and also includes capacitors C5, C8, C10 in series with the primary windings 608a-608c. This is another way of achieving the same functionality. In FIG. 1, the splitting capacitors are the resonant capacitors. In FIG. 6, the splitting capacitors are large and act as stiff voltage source, while separate series capacitors are used as the resonant capacitors.

Although shown in the above discussed Figs. as a half bridge converter, a power converter according to aspects of the present disclosure may be any type of isolated, i.e. including a transformer, power converter topology. In another embodiment of a power converter 700 according to one or more aspects of the present disclosure, for example, the power converter 700 is a full bridge converter. The power converter is coupled to receive a regulated input voltage from a buck converter 726. Except for being a full bridge converter instead of a half-bridge converter, the power converter 700 operates in a similar manner to the power converter 200.

As discussed above, at voltage outputs greater than 5V, power converters according to one or more aspects of the present disclosure can operate within reasonable regulation parameters without any regulation. In such power converters or in such branches of a power converter, a regulation circuit is not needed and may be omitted. For example, power converter 800, shown in FIG. 8, includes voltage outputs of +12V and +24V from a regulated input voltage provided by a buck converter 826. The power converter 800 is a half bridge configuration and operates similar to the power converter 200. However, because the inherent output voltage regulation, or load regulation, of the power converter 800 is sufficient for many applications, a regulation circuit is not used. Additionally, ultra fast rectifier diodes D2-D5, Schottky diodes, etc. are used instead of synchronous rectifiers.

The power converter 800 can be used for many applications, including LCD television power supplies. Most of the LCD panel TV power supplies use output voltages of 12V and 24V. Inherent load regulation of the power converter 800 is aided in an LCD television power supply by the fact that demanded output current is much lower than in computer power supplies and is typically in the range of 2A to 6A. LCD television power supplies are also designed for convection type cooling and, therefore, typically use heavier wire gauges to meet safety controlled transformer hot spot temperatures. This leads to lower winding resistance in the transformers TX1, TX2 which further improves the load regulation.

Like other power converters disclosed herein, the power converter 800 includes separate transformers TX1, TX2. However, a single transformer with multiple secondary windings can also be used in accordance with one or more aspects of the present application.

Figure 9:
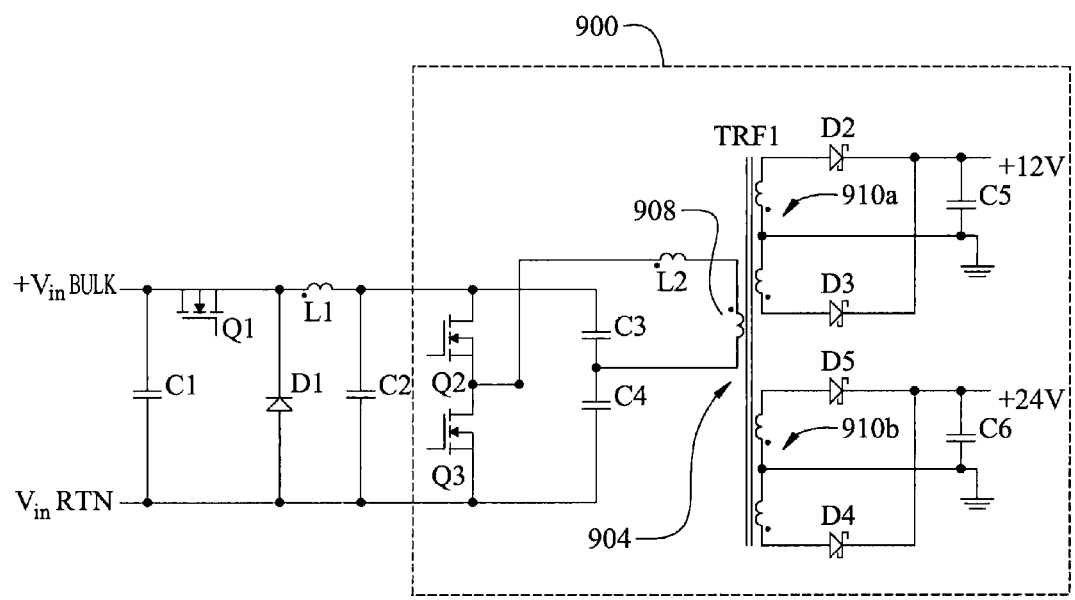
FIG. 9 is a circuit diagram of an unregulated multi-output isolated power converter having a half bridge configuration coupled to a regulated buck converter and utilizing a single transformer with multiple secondary windings.

FIG. 9 illustrates a power converter 900 similar to the power converter 800, but having a single transformer 904 for the multiple outputs. The transformer 904 includes a primary winding 908 and two secondary windings 910a and 910b. The secondary windings 910a and 910b are wound bi-filer to improve cross regulation. Variations in loading of secondary windings 910*a* and 910*b* may change the resonant frequency. To minimize this impact, an external resonant inductor L2 is inserted in series with the primary winding 908 such that its value is much larger than the leakage inductance of the transformer 904. The resonant frequency, therefore, is mainly dictated by the external resonant inductor L2 and not the loading of the different secondary windings 910*a* and 910*b*.

Figure 10:
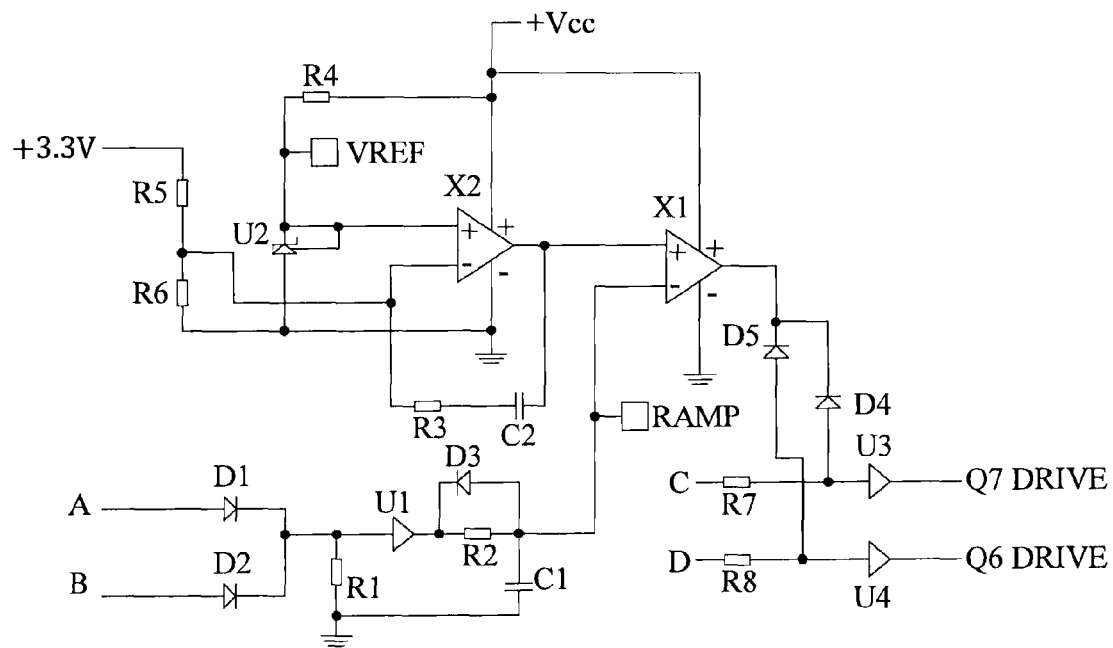
FIG. 10 is a circuit diagram of an alternate regulation circuit.
Figure 11:
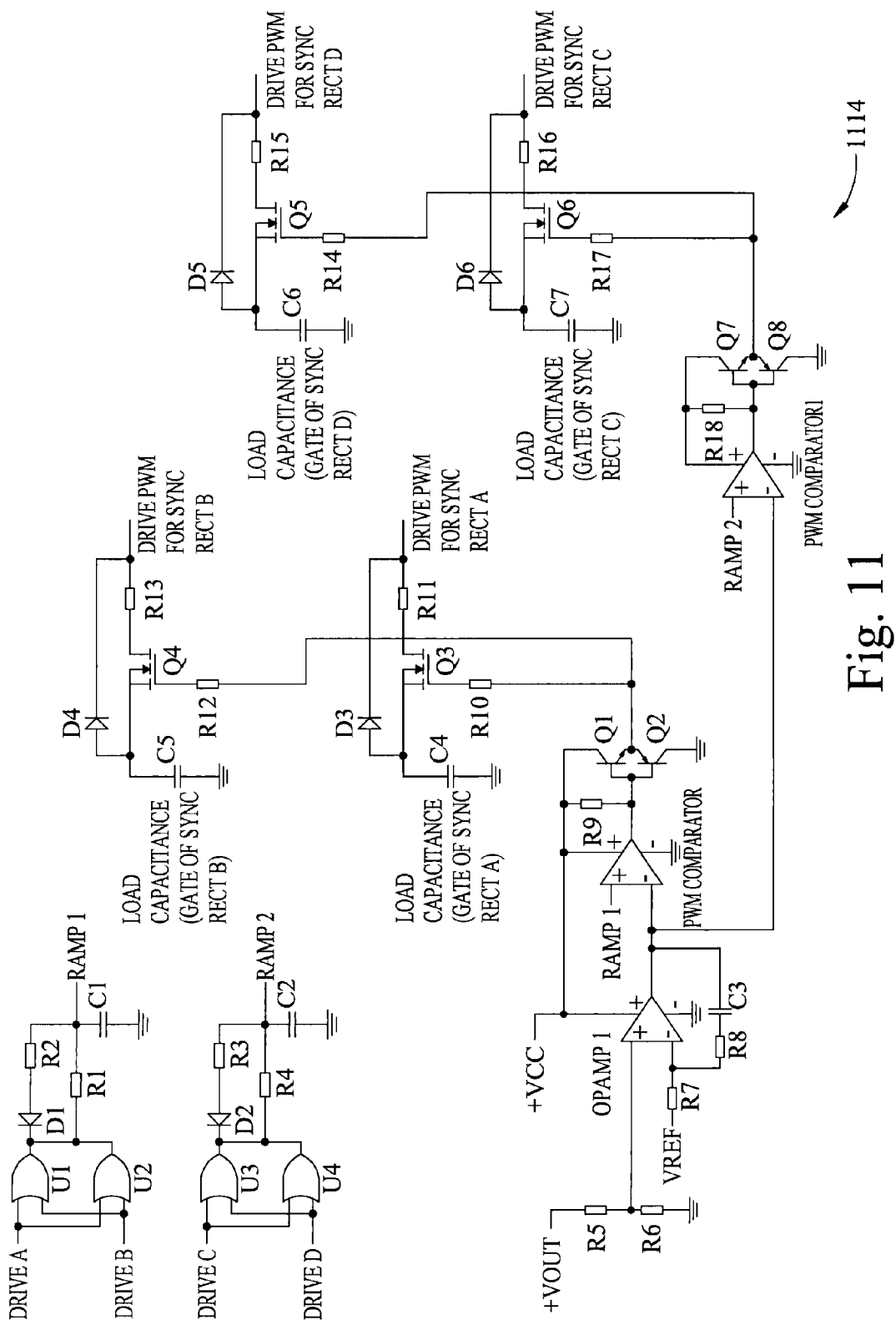
FIG. 11 is a circuit diagram of another alternate regulation circuit.

Alternate regulation circuits 1014 and 1114 are shown in FIGS. 10 and 11.

Figure 12:
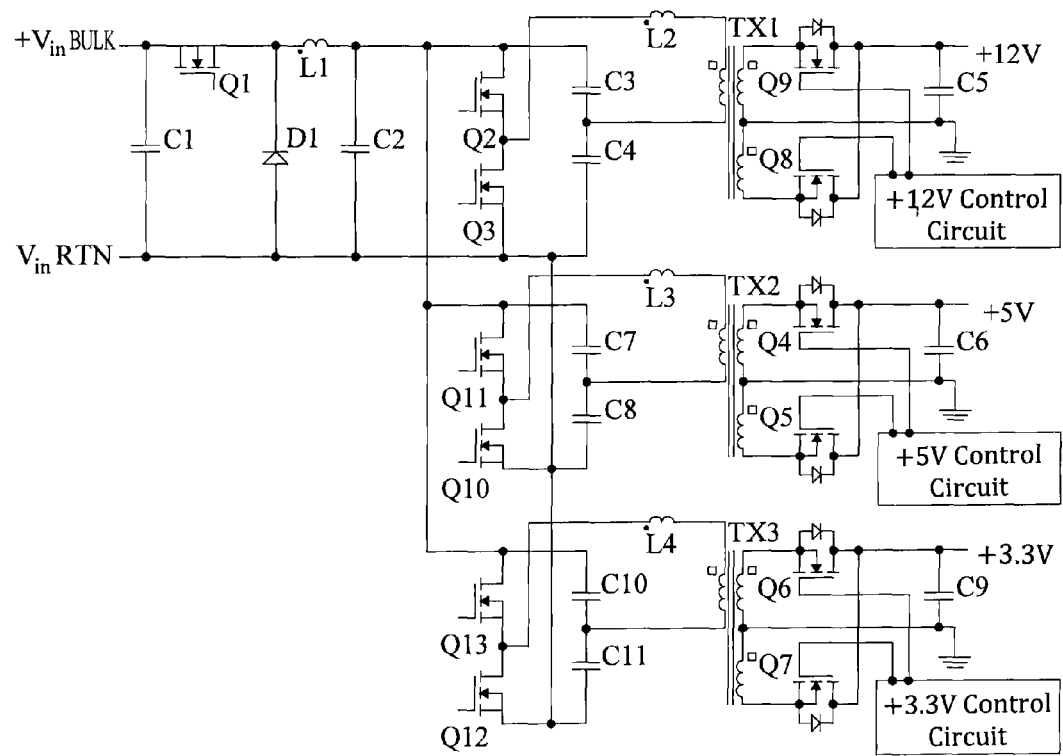
FIG. 12 is a circuit diagram of another multi-output isolated power converter having a half bridge configuration.

Although the power converters disclosed above use a common primary switching circuit for all output transformers, separate primary switching circuits may be used for each transformer. This approach will result in higher cost but will achieve similar results. All such primary switching circuits utilize common PWM drive signals for synchronized operation. Alternatively, the primary switching circuits can use different PWM drive signals having the same or different frequencies and/or duty cycles. One example of such an alternative circuit is shown in FIG. 12, which employs half bridges for each transformer. Alternatively, other topologies can be employed, such as full bridges. The regulation scheme can be the same as described above.

Some of the example power converters described herein can meet the regulation and transient step load performance of a multi-output power supply just inside the margins, at minimum costs, and with the highest possible conversion efficiency. Some example embodiments use a pre-regulated input to a DC transformer. Several DC transformers are used with required turns ratio to give desired output voltages. Because the DC input bus is tightly regulated by the pre-regulator, input voltage variations do not cause any change in the output voltage. However, the output voltage varies with output load due to circuit parasitics, resistivity and temperature effects. The regulation circuit is designed such that it will not act until the output gets very close to the upper output voltage limit and is likely to exceed the boundary limits. This results in a simplified and low cost control circuit and offers high conversion efficiency. Additionally, because the output voltage of the converter has a droopy characteristic, it assists in achieving the transient step load response requirements. When operated at higher load, the output voltage drops down and thus provides additional margin for overshoot when unloaded.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed:

1. An isolated DC/DC power converter having multiple outputs, the power converter comprising:
    an input for receiving a DC input voltage;
    a pre-regulator for generating a regulated DC voltage from the DC input voltage;
    first and second transformers each having a primary winding and a secondary winding;
    first and second output circuits coupled to the secondary windings of the first and second transformers, respectively, each output circuit including a synchronous rectifier and one of said multiple outputs;

a primary switching circuit having a primary switch, the primary switching circuit coupled between the pre-regulator and the primary winding of each transformer;

a first regulation circuit coupled to the synchronous rectifier of the second output circuit; and a control circuit coupled to the first regulation circuit and configured to generate a rectifier control signal for controlling the synchronous rectifiers of said output circuits;

wherein the first regulation circuit is configured to provide said rectifier control signal substantially unmodified to the synchronous rectifier of the second output circuit when a voltage at the output of the second output circuit is below a first threshold voltage, and to provide said rectifier control signal with a reduced on-time to the synchronous rectifier of the second output circuit when the voltage at the output of the second output circuit is substantially equal to or greater than the first threshold voltage.

2. The power converter of claim 1 wherein the control circuit is configured to provide a switch control signal to the primary switch having a substantially constant frequency and a substantially constant duty cycle.

3. The power converter of claim 2 wherein the rectifier control signal has substantially the same frequency and duty cycle as the switch control signal.

4. The power converter of claim 3 wherein the primary switching circuit includes a half-bridge or full-bridge series resonant converter.

5. The power converter of claim 3 wherein the control circuit is configured to provide said rectifier control signal to the synchronous rectifier of the first output circuit.

6. The power converter of claim 3 wherein DC input voltage is about 400 volts.

7. The power converter of claim 6 wherein the regulated DC voltage is about 300 volts.

8. The power converter of claim 3 further comprising a third transformer having a primary winding and a secondary winding, a third output circuit coupled to the secondary winding of the third transformer, and a second regulation circuit coupled to the synchronous rectifier of the third output circuit, wherein the control circuit is coupled to the second regulation circuit, and wherein the second regulation circuit is configured to provide said rectifier control signal substantially unmodified to the synchronous rectifier of the third output circuit when a voltage at the output of the third output circuit is below a second threshold voltage, and to provide said rectifier control signal with a reduced on-time to the synchronous rectifier of the third output circuit when the voltage at the output of the third output circuit is substantially equal to or greater than the second threshold voltage.

9. The power converter of claim 8 wherein the first threshold voltage is greater than the second threshold voltage.

10. The power converter of claim 8 wherein the first, second and third output circuits are configured to output nominal voltages of 12 volts, 5 volts and 3.3 volts, respectively.

11. The power converter of claim 3 wherein the pre-regulator is a buck converter.

12. An isolated DC/DC power converter for providing a plurality of output voltages, the power converter comprising:

a plurality of transformers, each of the plurality of transformers having a primary winding and a secondary winding;

a primary switching circuit coupled to the primary winding of each of the plurality of transformers, the primary switching circuit including an input for receiving an input voltage and at least one switch for switching current through the primary winding of each of the plurality of transformers;

a plurality of output circuits each coupled to a secondary winding of one of the plurality of transformers, each of the output circuits including an output for providing one of the plurality of output voltages, at least one rectifier and an output capacitor; and a regulation circuit coupled to one of the output circuits, the regulation circuit configured to delay the at least one rectifier of its associated output circuit from turning on for a period of time when the output voltage of its associated output circuit exceeds a threshold voltage.

13. The power converter of claim 12 further comprising a control circuit configured to switch the at least one switch with a substantially constant duty cycle.

14. The power converter of claim 13 wherein the at least one rectifier of each of the secondary side circuits is a synchronous rectifier.

15. The power converter of claim 14 wherein the control circuit is configured to provide a single control signal for controlling the synchronous rectifiers of each of the output circuits.

16. The power converter of claim 15 wherein the single control signal has a substantially constant duty cycle and a substantially constant frequency.

17. The power converter of claim 13 wherein the control circuit is configured to switch the at least one switch with a substantially constant frequency.

18. The power converter of claim 12 wherein at least two of the plurality of output voltages are different output voltages.

19. The power converter of claim 12 wherein the at least one rectifier of each of the output circuits is a synchronous rectifier, the power converter further comprising a control circuit configured to provide a single control signal for controlling the synchronous rectifiers of each of the output circuits.

20. The power converter of claim 19 wherein the single control signal has a substantially constant duty cycle and a substantially constant frequency.

21. An isolated DC/DC power converter having an input for receiving a DC input voltage and multiple outputs, the power converter comprising:

a plurality of output circuits including at least a first output circuit and a second output circuit, the second output circuit including a synchronous rectifier and one of said multiple outputs; and at least one regulation circuit coupled to the synchronous rectifier of the second output circuit, the regulation circuit configured to provide a rectifier control signal substantially unmodified to the synchronous rectifier of the second output circuit when a voltage at the output of the second output circuit is below a first threshold voltage, and to provide said rectifier control signal with a reduced on-time to the synchronous rectifier of the second output circuit when the voltage at the output of the second output circuit is equal to or greater than the first threshold voltage.

22. The power converter of claim 21 wherein the rectifier control signal has a substantially constant duty cycle and a substantially constant frequency.

23. The power converter of claim 22 further comprising a plurality of transformers, each transformer having a primary winding and a secondary winding, each secondary winding coupled to one of the plurality of output circuits, and at least one primary switching circuit coupled to the primary winding of at least one of the plurality of transformers, the at least one primary switching circuit having at least one switch controlled by a switch control signal.

24. The power converter of claim 23 wherein the switch control signal has a substantially constant duty cycle and a substantially constant frequency.

25. The power converter of claim 24 wherein the rectifier control signal has substantially the same frequency and duty cycle as the switch control signal.

26. The power converter of claim 25 further comprising a control circuit for providing the switch control signal and the rectifier control signal.

27. The power converter of claim 25 wherein the at least one primary switching circuit is coupled to the primary winding of each of the plurality of transformers.

28. The power converter of claim 25 wherein the at least one primary switching circuit includes a plurality of primary switching circuits, each primary switching circuit coupled to the primary winding of one of the plurality of transformers.

29. The power converter of claim 25 further comprising a pre-regulator coupled to the at least one primary switching circuit, the pre-regulator configured to generate a regulated DC voltage from the DC input voltage.

* * * * *